US006724768B1

(12) United States Patent
Melvin

(10) Patent No.: US 6,724,768 B1
(45) Date of Patent: Apr. 20, 2004

(54) METHOD AND SYSTEM FOR ENFORCING MAXIMUM TRANSIT DELAY IN NETWORK MULTIPLEXERS

(75) Inventor: Bruce W. Melvin, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/449,840

(22) Filed: Nov. 26, 1999

(51) Int. Cl.[7] .............................................. H04L 12/54
(52) U.S. Cl. ...................................... 370/412; 370/429
(58) Field of Search ................................ 370/229, 230, 370/230.1, 232, 233, 234, 235, 236, 412, 413, 414, 415, 416, 417, 418, 419, 428, 429; 709/212, 213, 223, 224, 232; 711/133, 159

(56) References Cited

U.S. PATENT DOCUMENTS

| | | | | |
|---|---|---|---|---|
| 5,751,951 A | * | 5/1998 | Osborne et al. | 395/200.8 |
| 5,951,706 A | * | 9/1999 | Benner | 714/749 |
| 5,996,019 A | * | 11/1999 | Hauser et al. | 709/235 |
| 6,031,842 A | * | 2/2000 | Trevitt et al. | 370/412 |
| 6,144,640 A | * | 11/2000 | Simpson et al. | 370/236 |
| 6,256,315 B1 | * | 7/2001 | Barbas et al. | 370/412 |
| 6,292,490 B1 | * | 9/2001 | Gratacap et al. | 370/412 |
| 6,405,258 B1 | * | 6/2002 | Erimli et al. | 709/235 |
| 6,556,579 B1 | * | 4/2003 | Lindeborg et al. | 370/412 |

* cited by examiner

Primary Examiner—Steven H. D Nguyen
Assistant Examiner—Duc Duong

(57) ABSTRACT

A method and system for preventing the transmission of stale communications packets by a network multiplexer. Common network hardware and protocol specifications require that communications delayed in transit through a network multiplexer must be discarded after a specified period of time. The method and system employ single bit flags within transmit queue entries to flag queue entries that become stale due to the passage of time while communications packets received by a network multiplexer are stored within the network multiplexer for subsequent transmission. A global clock within the network multiplexer invokes a transmit queue monitoring function at one-second intervals. The transmit queue monitoring function discards queue entries having single bit flag values of "1," and sets the bit flag values of the remaining queue entries to "1". In this manner, queue entries are discarded after residing within the queue for between slightly more than one second and slightly less than two seconds. Known queue entries can reside in the queue for two seconds or longer.

13 Claims, 18 Drawing Sheets

| ADDRESS | PORT |
|---|---|
| NODE A | X |
| PRINTER | X |
| NODE B | Y |
| NODE C | Y |

*Fig. 4*

| ADDRESS | MEDIUM |
|---|---|
| NODE A | 1 |
| PRINTER | 1 |
| NODE B | 2 |
| NODE C | 2 |

*Fig. 6A*

| PORT | MEDIUM |
|---|---|
| X | 1 |
| Z | 1 |
| Y | 2 |
| W | 2 |

*Fig. 6B*

```
1  const QUEUE_SIZE = 10;
2
3  class message
4  {
5      public:
6              int    getLength();
7              int    getSource();
8              int    getDestination();
9              char*  getMessage();
10             message();
11             ~message();
12 };
13
14 class messageDescriptor
15 {
16     private:
17             message* msgPtr;
18             bool     flag;
19
20     public:
21             message* getMsg();
22             void     setMsg(message *m);
23             void     zeroFlag();
24             bool     query();
25             messageDescriptor();
26             ~messageDescriptor();
27 };
28
29 void messageDescriptor::zeroFlag()
30 {
31     flag = FALSE;
32 }
33
34 bool    messageDescriptor::query()
35 {
36     if (flag) return TRUE;
37     else
38     {
39             flag = TRUE;
40             return FALSE;
41     }
42 }
```

*Fig. 12A*

```
1  class transmitQueue
2  {
3      private:
4              messageDescriptor queue[QUEUE_SIZE];
5              int head;
6              int tail;
7              bool empty();
8              bool full();
9              int num();
10             bool inc(int & ptr);
11             bool dec(int & ptr);
12
13     public:
14             bool queueMDesc (messageDescriptor & msg);
15             bool dequeueMDesc (messageDescriptor & msg);
16             void tick();
17             transmitQueue();
18             virtual ~transmitQueue();
19 };
20
21 bool transmitQueue::empty()
22 {
23     if (head == tail) return TRUE;
24     else return FALSE;
25 }
26
27 bool transmitQueue::full()
28 {
29     if (head > tail)
30     {
31         if ((head == (QUEUE_SIZE - 1)) &&
32             (tail == 0)) return TRUE;
33     }
34     else if ((tail - head) == 1) return TRUE;
35     return FALSE;
36 }
37
38 int transmitQueue::num()
39 {
40     if (head > tail) return head - tail;
41     else return QUEUE_SIZE - tail + head;
42 }
43
44 bool transmitQueue::inc(int & ptr)
45 {
46     if (ptr == head return FALSE;
47     else
48     {
49         ptr++;
50         if (ptr == QUEUE_SIZE) ptr = 0;
51         return TRUE;
52     }
53 }
54
```

*Fig. 12B*

```
55 bool transmitQueue::dec(int & ptr)
56 {
57     if (ptr == tail) return FALSE;
58     ptr--;
59     if (ptr < 0) ptr = QUEUE_SIZE - 1;
60     return TRUE;
61 }
62
63 bool transmitQueue::queueMDesc (messageDescriptor & msg)
64 {
65     if (full()) return FALSE;
66     msg.zeroFlag();
67     queue[head++] = msg;
68     if (head == QUEUE_SIZE) head = 0;
69     return TRUE;
70 }
71
72 bool transmitQueue::dequeueMDesc (messageDescriptor & msg)
73 {
74     if (empty()) return FALSE;
75     if (head == tail) return FALSE;
76     msg = queue[tail++];
77     if (tail == QUEUE_SIZE) tail = 0;
78     return TRUE;
79 }
80
81 void transmitQueue::tick()
82 {
83     int i;
84
85     if (empty()) return;
86     i = head;
87     dec(i);
88     while (!queue[i].query()) if (!dec(i)) return;
89     tail = i;
90     inc (tail);
91 }
92
93 transmitQueue::transmitQueue()
94 {
95     head = tail = 0;
96 }
```

*Fig. 12C*

US 6,724,768 B1

METHOD AND SYSTEM FOR ENFORCING MAXIMUM TRANSIT DELAY IN NETWORK MULTIPLEXERS

TECHNICAL FIELD

The present invention relates to forwarding of communications packets by a network multiplexer between separate communications network media coupled through the network multiplexer, and, in particular, to a method and system for guaranteeing maximum communications packet transit delays during communications packet forwarding by the network multiplexer.

BACKGROUND OF THE INVENTION

Bridges, switches, and routers are all examples of network multiplexers. A network multiplexer forwards communications packets received from one communications network medium via a network multiplexer port to one or more destination communications media via one or more destination network multiplexer ports. Communications packets received by a network multiplexer are stored in memory of the network multiplexer and then forwarded to the destination ports. Message descriptors referencing the stored communications packet are placed into a transmit queue associated with each destination port. Many networking hardware and protocol standards, such as ethernet, require that a communications packet received by a network multiplexer be transmitted by the network multiplexer within some maximum transit delay period. In the case of the ethernet, the maximum transit delay is four seconds, but transit delays of not more than one second are recommended.

A problem in network multiplexers is that transmit queues can back up due to delays in transmitting queued packets by the transceiver associated with a port. For example, in the ethernet environment, a transmitter is required to wait for periods of increasing lengths following detection of packet collisions on the ethernet. It is often the case that the transceiver of a port associated with the transmit queue, following a back off or other transmission delay, cannot possibly transmit the remaining queued packets on the transmit queue within the maximum allowable transit delay for the most recently queued communications packets. Therefore, a method is required for identifying and discarding such stale packets from transmit queues. Currently-available methods include time stamps and local transmit timers within ports, but the former method may be expensive in terms of memory usage, and the latter method is unreliable. Therefore, network multiplexer designers, architects, and manufacturers have recognized the need for a memory-efficient and reliable method for ensuring that communications packets that cannot be forwarded in sufficient time to meet the maximum transit delays are discarded.

SUMMARY OF THE INVENTION

The present invention provides a method and system for recognizing communications packets within a network multiplexer that cannot be forwarded to an appropriate network medium within a specified maximum transit delay time, so that these stale communications packets may be subsequently discarded. In the method and system of the present invention, a single flag bit is included in each message descriptor or queue entry in a transmit queue. When a message descriptor is initially placed into the queue, the flag bit is initially set to zero. A global system clock periodically awakens a transmit queue monitoring function that examines each entry queue in each transmit queue, setting each flag bit having the value "0" to "1" and discarding each queue entry, or message descriptor, having a flag bit already set to "1." By this method, communications packets are not transmitted by the network multiplexer when they cannot reach their intended destination within a maximum transmit delay specified for the network medium through which the sending device is connected. By using only a single bit per queue entry, very little memory is used to implement the present invention.

BRIEF DESCRIPTION OF THE DRAWINGS

FIG. 4 shows an address table for the network of FIG. 1.

FIG. 6 shows a portion of an address table for the network multiplexer of FIG. 5.

FIGS. 12A–C provide a C++-like pseudo-code implementation of the present invention.

DETAILED DESCRIPTION OF THE INVENTION

Figure 1:
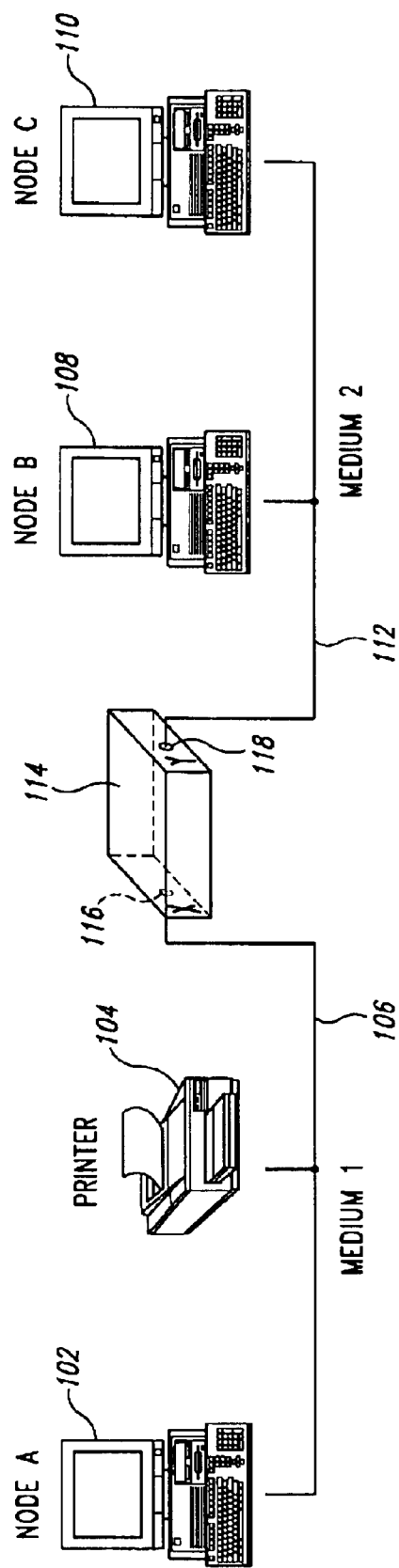
FIG. 1 displays a simple communications network comprising two physically separate network media linked together by a network multiplexer.

Switches, routers, and bridges are multi-port communications network infrastructure devices that forward communications network packets received from transmitting network devices on or more source network media to receiving network devices on one or more destination network media. Switches, routers, and bridges are all examples of network multiplexers. FIG. 1 displays a simple communications network comprising two physically separate network media linked together by a network multiplexer. A network medium may be a single ethernet, token ring, or other similar communications network physical transport medium to which a number of network devices, such as computers, printers, disk arrays, and network multiplexers, are attached. In FIG. 1, a computer system 102 and a printer 104 are linked together via a first network medium 106. A second computer system 108 and a third computer system 110 are linked together by a second network medium 112. Both the first and second network media 106 and 112 are linked together by a network multiplexer 114. In the following discussion, the first, second, and third computer systems are referred to as "node A," node B," and "node C," respectively. The network multiplexer 114 allows node A 102 and the printer 104, linked together via network medium 106, to communicate with node B 108 and node C 110, linked together by network medium 112. The network multiplexer contains two ports, port "X" 116 and port "Y" 118. The network multiplexer 114 receives communications packets, or messages, from node A 102 and the printer 104 through port X 116 and transmits communications packets to node A 102 and the printer 104 through port "X" 116. In similar fashion, the network multiplexer 114 receives communications packets from, and transmits communications packets to, node B 108 and node C 110 via port "Y" 118.

Figure 2:
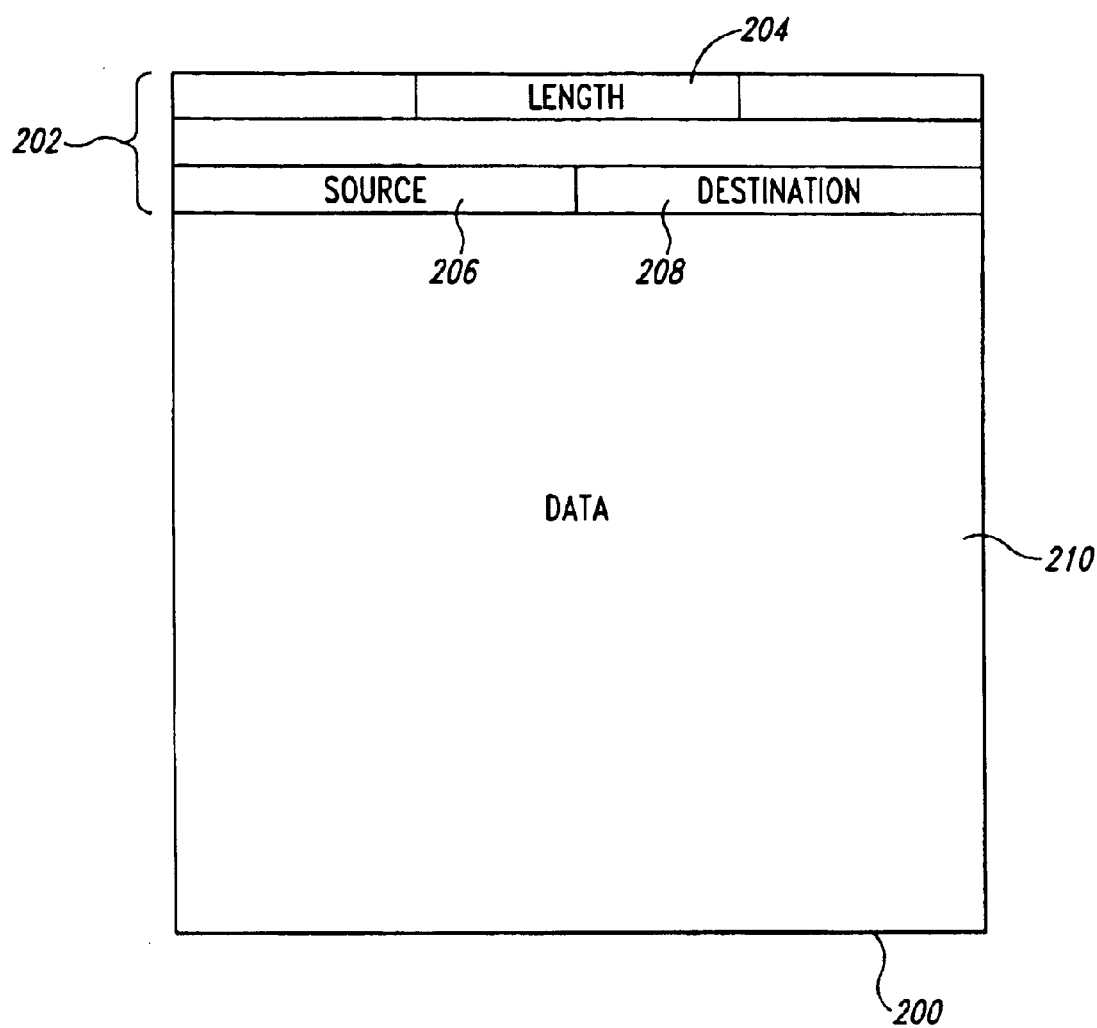
FIG. 2 shows a generalized representation of a communications packet.

FIG. 2 shows a generalized representation of a communications packet. A communications packet 200 is a sequence of computer bytes. Communications packets generally vary in length. A header 202 is a first, fixed-length and fixed-format portion of a communications packet. The header contains, among other information, numerical fields that indicate the total length of the communications packet 204, the address of the network device that originally transmitted the communications packet 206, and the address of the network device to which the communications packet is directed 208. Following the header is a variable length field that contains the computer data included in the communications packet 210. Depending on the type of communications medium, the header may contains many additional fields, including a sequence number and error correction codes, and the fields may occupy many different relative positions to one another and to the start of the header. The contents of the source and destination fields 206 and 208 of the header 202 are referred to as the "source address" and "destination address," respectively, in the following discussion.

Figure 3:
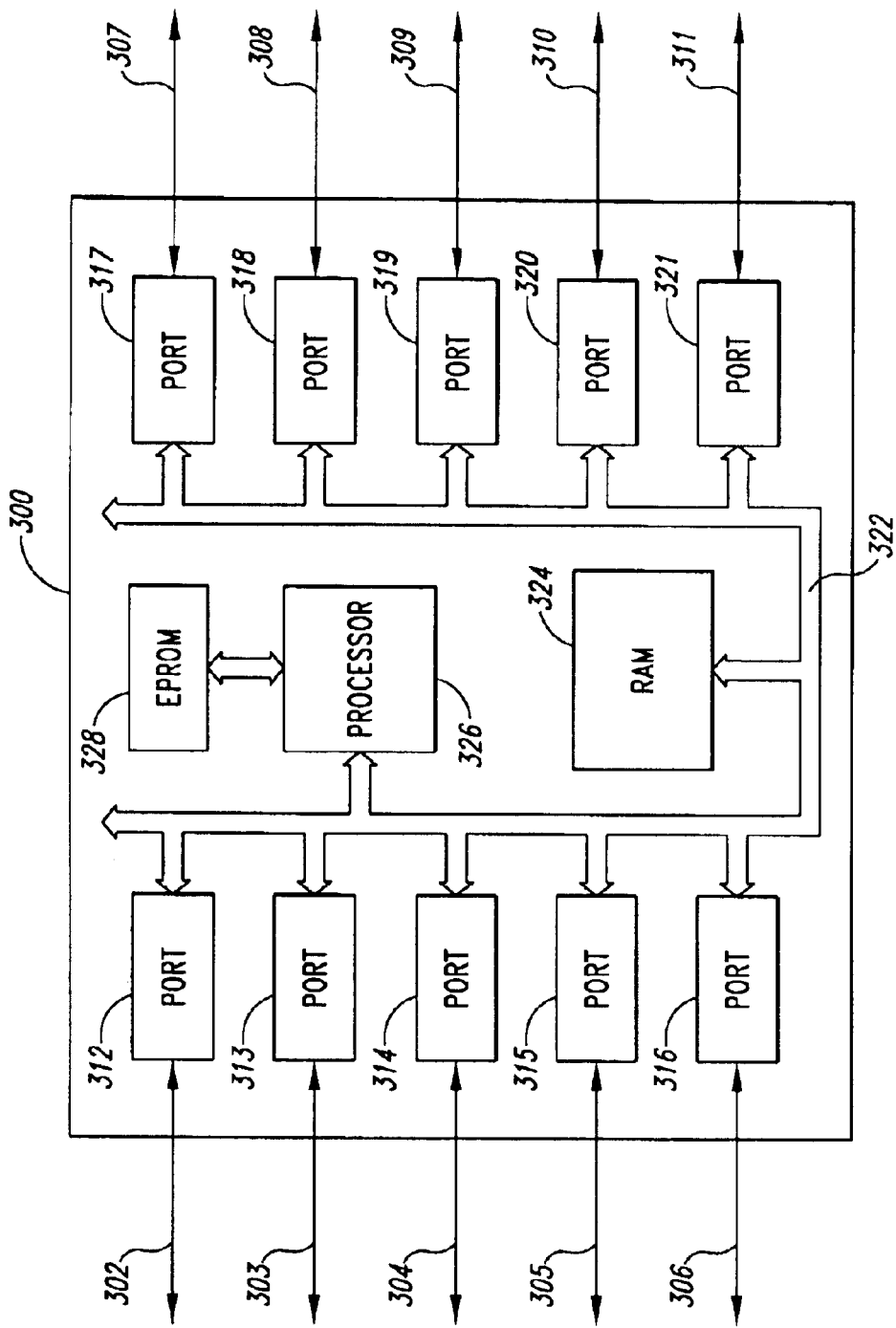
FIG. 3 shows a generalized block diagram of a network multiplexer.

FIG. 3 shows a generalized block diagram of a network multiplexer. The network multiplexer 300 is connected, in FIG. 3, to ten different network media 302–311. Within the network multiplexer, each network medium 302–311 is electronically connected to a port 312–321. Each port comprises a transceiver device that receives and transmits communications packets and control logic that interprets certain fields of the communications packets in order to implement the lower level networking protocols for the type of network media to which the port is connected, and, additionally, interfaces to an internal communications bus 322 and memory 324. A port may store received communications packets into known locations in the memory 324 and may retrieve communications packets for transmission from known locations in the memory 324. A network multiplexer may also contain a processor 326 and non-volatile memory 328 that stores control routines executed by the processor 326. Alternatively, in place of a processor and non-volatile memory, a network multiplexer may employ complex logic to control forwarding of communications packets from one port to another, or may employ a combination of a processor and specialized logic.

When a network multiplexer receives a communications packet from a port, the network multiplexer must determine whether to forward the received communications packet to another port or ports, or to drop the received communications packet. For example, if the network multiplexer 114 of FIG. 1 receives a communications packet from port X 118 with source address corresponding to node A 102 and destination address corresponding to the printer 104, the network multiplexer 114 may simply drop the received communications packet without forwarding the communications packet to port Y 118, assuming that network medium 106 is a broadcast-type medium in which the communications controllers of all networking devices connected to the network medium examine each communications packet transferred through the network medium. In the present case, both the printer 104 and the network multiplexer 114 will receive the communications packet transmitted from node A 102 to the printer 104, and there is no need for the network multiplexer to transmit the communications packet to the printer a second time. In fact, a second, duplicate transmission may cause problems for a receiving node, and for the node that originally transmitted the packet. However, in the case that node A 102 transmits a communications packet to node B 108, the network multiplexer 114 receives the transmitted communications packet on port X 116 and needs to transmit the communications packet via port Y 118 to network medium 112 in order for node B 108 to receive the communications packet, since because network media 106 and 112 are physically distinct. The network multiplexer 114 in FIG. 1 is the only bridge, or link, between network medium 106 and network medium 112. When the network media interconnected by a network multiplexer are of the same type and employ universal source and destination addresses, the network multiplexer may simply forward received packets. In other cases, the network multiplexer may need to reformat received packets prior to forwarding them.

Unfortunately, the network multiplexer does not contain a hard-wired, destination-address-to-port translation mechanism. Thus, in the previous example, when the network multiplexer 114 receives a communications packet on port X 116 from node A 102 addressed to node B 108, the network multiplexer has no hard-wired translation mechanism to determine to which of network media 106 and 112 node B is connected. In the case of ethernet network media, for example, 48-bit source and destination addresses are employed. Thus, there may be trillions of different valid, unique ethernet device addresses. Ethernet devices receive their unique addresses at the time of manufacture, prior to their connection to a particular ethernet. Ethernet devices may be removed from one ethernet and connected to another ethernet following their initial connection to an ethernet. There is simply no way to assign an a priori correspondence between ethernet addresses and particular network media, and, even if there were a way to make an a priori assignment, the size of the assignment table would exceed any currently-available technology for economically storing such a volume of information within a network multiplexer.

Rather than employing a hard-wired translation mechanism, network multiplexers commonly learn the correspondence between network addresses and ports over time, and store the correspondences in an address table. FIG. 4 shows an address table for the network of FIG. 1. Each network address in the first column 402 of the address table is paired with a corresponding port in the second column 404 of the address table. Before the network multiplexer receives a communications packet originally transmitted by a network device having a particular network address, that particular network address will not appear in the address table. When the network multiplexer receives a communications packet with a destination network address that is not currently contained in the address table, the network multiplexer must forward the received communications packet to all the different network media to which the network multiplexer is connected, including the network medium from which the communications packet was received, since the network multiplexer cannot determine to which port the destination address corresponds. After the network multiplexer receives a communications packet from a network device having the particular network address, a correspondence between the particular network address and the port through which the communications packet was received is entered by the network multiplexer into the address table. Then, whenever the network multiplexer receives a communications packet having that particular network address as the destination address of the communications packet, the network multiplexer can find the correspondence between the particular network address and a port in the address table, and can forward the communications packet to the correct port. In the case that the communications packet is received from the same port through which the communications packet would otherwise be forwarded, the network multiplexer can simply drop the packet without forwarding it.

Figure 5:
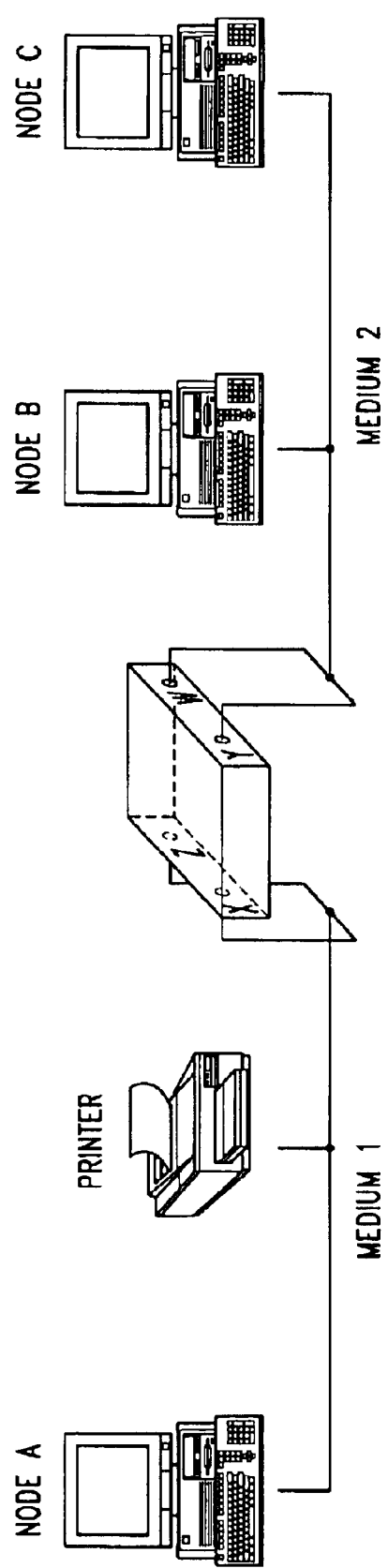
FIG. 5 displays a network multiplexer interconnecting eight different network media.

Network multiplexers may be connected to a large number of different network media through a large number of corresponding ports. FIG. 5 displays a network multiplexer interconnecting eight networks, and FIG. 6 shows a portion of an address table for this network multiplexer. The address table 602 in FIG. 6 may contain many different network addresses corresponding to a particular port, such as network addresses 604–607 associated with the network medium connected to the network multiplexer via port 8.

Figure 7:
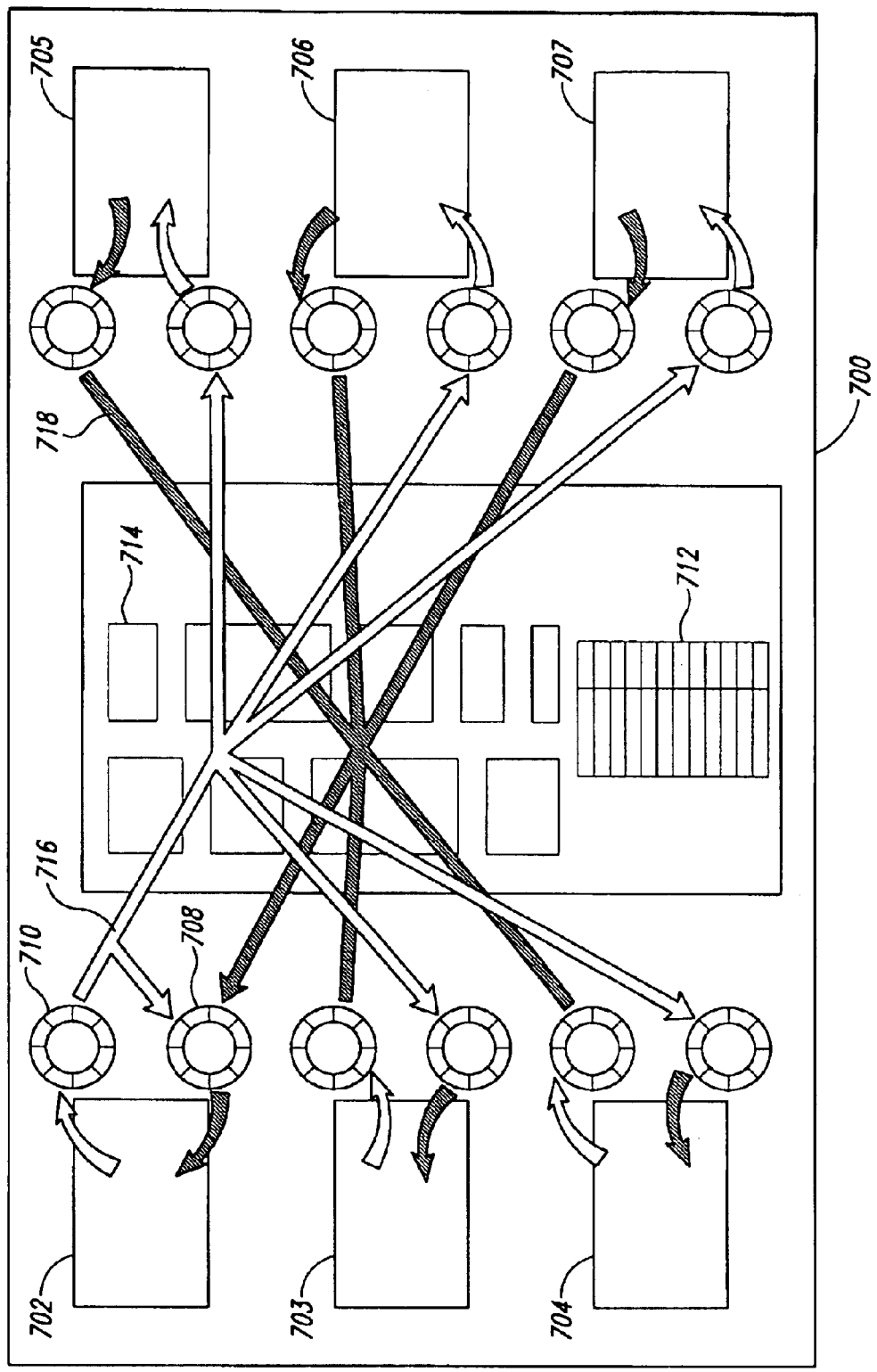
FIG. 7 illustrates the logical components of a network multiplexer.

FIG. 7 illustrates the logical components of a network multiplexer. The network multiplexer 700 of FIG. 7 includes six ports 702–707. Each port is associated with a transmit queue and a receive queue, such as the transmit queue 708 and the receive queue 710 associated with port 702. Both transmit and receive queues are composed of contiguous memory locations within the memory of the network multiplexer (324 in FIG. 3). The memory of the network multiplexer (324 in FIG. 3) is shown in FIG. 7 as also containing an address table 712 and various stored communications packets, such as stored communications packet 714. The transmit and receive queues, such as transmit and receive queues 708 and 710, contain message descriptors that indicate the memory locations of stored communications packets, such as stored communications packet 714, and may contain additional information fields. The communications controller components of the ports receive communications packets for transmission via message descriptors contained in transmit queues, and place communications packets received from the corresponding network medium into memory locations described by message descriptors contained in receive queues. A principle task of the network multiplexer is to move message descriptors from receive queues to transmit queues using information contained in the source and destination fields of the communications packet headers referenced by the message descriptors along with information stored in address table 712. For example, in FIG. 7, the multi-headed arrow 716 illustrates the transfer of message descriptors from the receive queue 710 of port 702 to the transmit queues of the remaining ports 703–707, and the multi-headed arrow 718 indicates the transfer of message descriptors from the receive queues of ports 703–707 to the transmit queue 708 of port 702. Equivalent systems of arrows can be drawn with respect to each of the remaining ports 703–707.

When the port 702 receives a communications packet from its corresponding network medium, the port obtains a memory location allocated for storage of an incoming communications packet, places the communications packet into memory starting at the obtained memory location, and stores a reference to the memory location, possibly along with additional information, into a message descriptor in the receive queue 710. Then, the network multiplexer moves the message descriptor that describes the location of the received communications packet from the receive queue 710 of port 702 to a transmit queue of one of the ports 702–707.

Conversely, when one of ports 702–707 receives a communications packet addressed to a network device linked to the network medium associated with port 702, that port obtains a memory location into which the received communications packet is stored, and stores a reference to the memory location, possibly along with additional information, into a message descriptor in the receive queue associated with the port. The network multiplexer then transfers the message descriptor from the receive queue of the port that received the communications packet to the transmit queue 708 of port 702 to allow port 702 to forward the received communications packet to the network medium associated with port 702. Of course, in the case that destination network addresses cannot be found in the address table 712, as discussed above, then the network multiplexer must place copies of the message descriptor into each transmit queue of each port, a process called "flooding." The network multiplexer is responsible for maintaining message descriptors in the receive queues of all ports that refer to free locations in memory into which received communications packets can be stored. There are many well-known approaches to maintaining message descriptors in receive queues, and this aspect of network multiplexer logic will not be further discussed or treated in a subsequent illustrative pseudo-code implementation.

Figure 8:
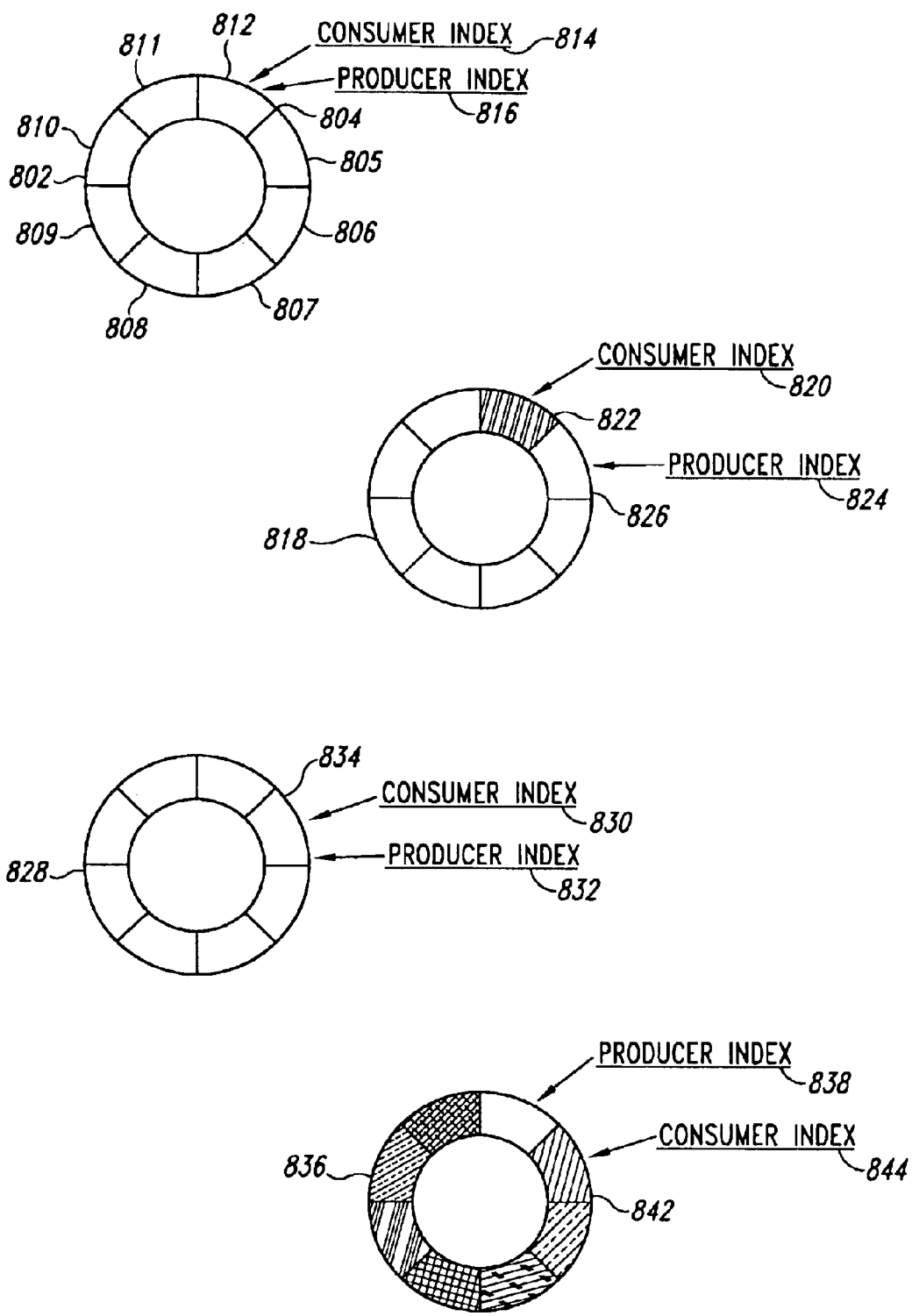
FIG. 8 illustrates the circular queue data structure used for transmit and receive queues in a network multiplexer.

Generally, circular queues are employed by network multiplexers and communications controllers for both receive queues and transmit queues. FIG. 8 illustrates the circular queue data structure used for transmit and receive queues in a network multiplexer. A circular queue is a first-in-first-out ("FIFO") queue that is logically represented in a circular fashion, such as the depiction of the circular queue 802 at the top of FIG. 8. Each radial section 804–812, or slot, of a circular queue contains space for a queue entry, in the case of network multiplexers, a message descriptor. The circular queue 802 in FIG. 8 is shown with 8 queue entry slots 804–812 although, in practice, a circular queue may have many tens or hundreds of queue entries. In addition to the queue entry slots, a circular queue is associated with two pointers: (1) a consumer index that points to the next queue entry that can be removed from the circular queue by a consumer of queue entries; and (2) a producer index that points to the next open slot within the circular queue in which a producer can place a queue entry to be added to the queue. Alternatively, the consumer index may be called the "tail" and the producer index may be called the "head." In an empty circular queue 802, in which all the queue entry slots are available for placement of data by a producer and in which none of the queue entry slots contain valid queue entries to be consumed by a consumer, both the consumer index 814 and the producer index 816 point to the same empty queue entry slot 812.

When a producer adds a queue entry to an empty circular queue 802, a circular queue with one valid queue entry 818 is produced. The consumer index 820 is not changed, as a result of which the consumer index points to the single valid queue entry 822 in the circular queue 818. After the producer inserts the queue entry 822, the producer increments the producer index 824 to point to the next available slot 826 within the circular queue 818 into which the producer can add a second queue entry. If the consumer now removes the single queue entry 822, an empty circular queue 828 is produced. When the consumer has removed the available queue entry 822, the consumer increments the consumer index 830. As in the previous depiction of an empty circular queue 802, the empty circular queue 828 produced by removing the single queue entry 822 has both the consumer index 830 and the producer index 832 pointing to the same empty, available queue entry slot 834. If a producer successively adds queue entries at a faster rate than a consumer can consume them, a full circular queue 836 will eventually be produced. In a full circular queue 836, the producer index 838 points to a single empty queue entry slot within the circular queue that immediately precedes the first available valid queue entry 842 pointed to by the consumer index 844.

A transmitting device expects to receive an acknowledgement packet from a receiving device within some maximum period of time. If an acknowledgement is not received by the transmitting device within the period of time, the transmitting device will attempt to retransmit the unacknowledged communications packet to the receiving device. Complexities in network controller control functionality may arise in the case that the transmitting device retransmits a communications packet that is delayed for a time greater than the maximum period of time for acknowledgement, but that is received by the receiving device and subsequently acknowledged by the receiving device. Thus, in order to forestall the repercussions resulting from the acknowledgement of packets assumed to have been lost by transmitting nodes, the maximum transmit delay is specified by the network medium hardware specification and protocol specification. If a transmitted packet is not received by a receiving network device within a maximum transit delay time, the transmitting device can assume that the packet was lost or garbled in transmission.

Network multiplexers introduce a potential delay in the transmission time for communications packets. The transceiver associated with a port may be unable, for a period of time, to transmit packets for which message descriptors have been placed in its associated transmit queue. In this case, the transmit queue may accumulate a relatively large number of queued message descriptors, and even if the transceiver resumes uninterrupted operation, the most recently queued packets in the transmit queue may not be transmitted by the transceiver in a sufficiently timely fashion to allow the packets to reach their intended destination devices within the maximum time for acknowledgement. Therefore, the network multiplexer needs a method for detecting stale packets queued to transmit queues from those transit queues to prevent their transmission by the transceiver of an associated port following expiration of the maximum delay time for the stale packets. For example, the IEEE802.1D ethernet standard specifies that packets should be discarded when their transmit delay time has exceeded one second and that in no case should the transit time for a packet exceed four seconds.

Figure 9:
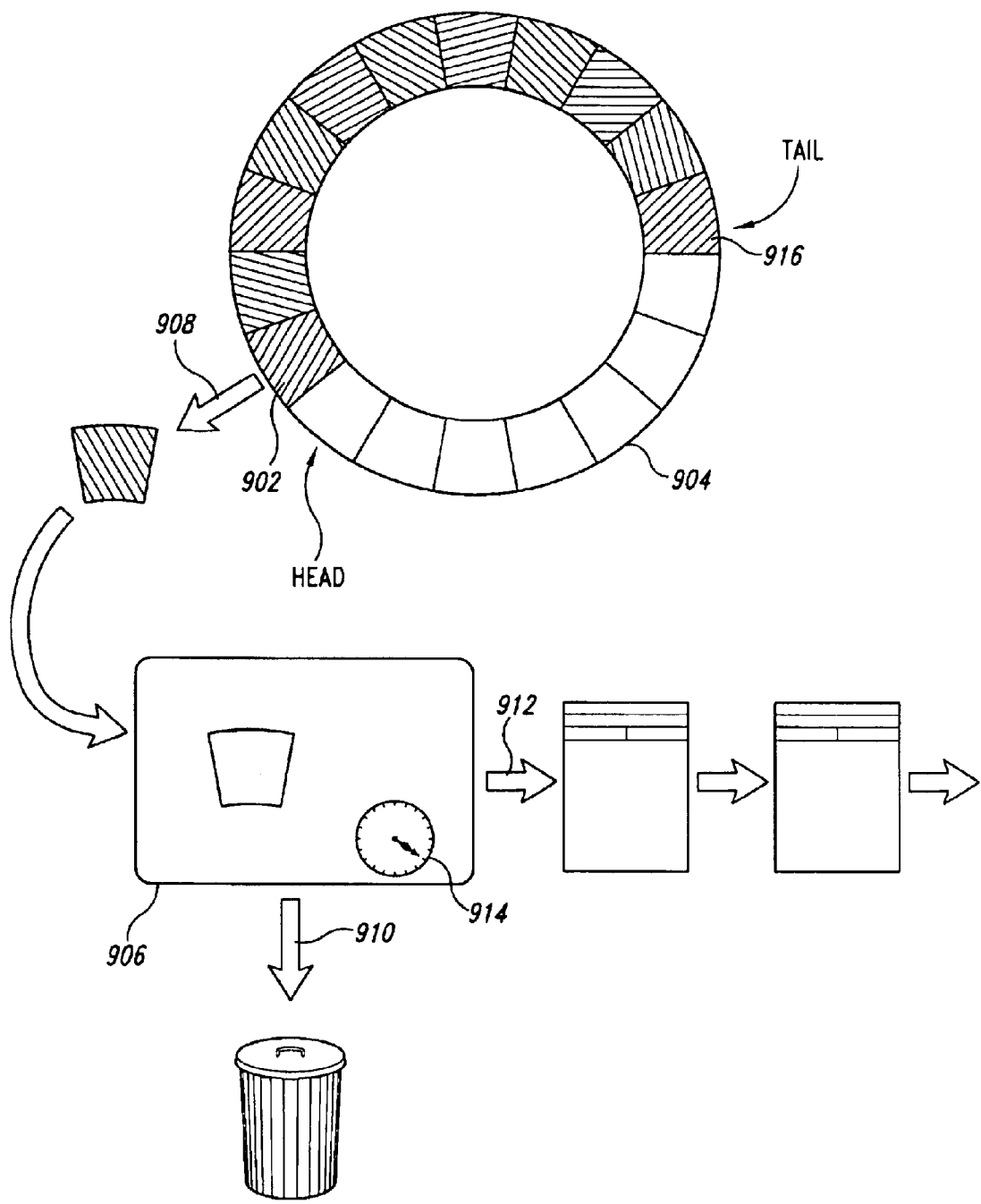
FIG. 9 illustrates a currently-available technique for attempting to prevent transmission of stale packets.

FIG. 9 illustrates a currently-available technique for attempting to prevent transmission of stale packets. As shown in FIG. 9, message descriptors. e.g. message descriptor 902, in the transmit queue 904 associated with a network multiplexer port 906 are successively removed from the transmit queue by the port (indicated in FIG. 9 by arrow 908) and either discarded 910 or, in the most common case, used by the port to retrieve the contents of a data packet from memory in order that the retrieved communications packet can be transmitted 912 to the communications network medium associated with the port. The port includes a local timer 914 that is reset upon transmission of each communications packet and is incremented at frequent clock intervals prior to transmission of the next communications packet. If the timer exceeds some threshold value prior to transmission of a next communications packet dequeued by the port from the transmit queue, the communications packet is assumed by the port to have not been successfully transmitted and is discarded 910. Normally, the local timer expires after between 10 and 200 milliseconds. However, if the transmit queue 904 contains sufficient entries, then a recently queued entry, such as entry 916, may fail to reach the port 906 prior to its maximum transit delay time because of transmit failures of packets described by message descriptors queued ahead of the recently queued descriptor 916. If the port succeeds in transmitting entry 916 after a failed transmission of 20 previous packets with local timer expiration after 200 milliseconds, then even if the communications packet referenced by entry 916 is successfully transmitted prior to the 200 millisecond timer expiration, the entry 916 will have resided in the transmit queue for more than the specified four-second maximum transit delay time. Another problem with the technique illustrated in FIG. 9 is that the transceiver, during the back off process due to collisions, may be unable to transmit a packet within the local timer expiration period, although, in principle, the packet could still be transmitted successfully providing that the maximum transit delay time has not been exceeded. Therefore, by setting the local timer expiration period to a relatively short period in order to prevent the first problem outlined above, the port may end up unnecessarily discarding packets due to the transceiver back off protocol. Thus, the technique illustrated in FIG. 9 is both unreliable and potentially inefficient.

Figure 10:
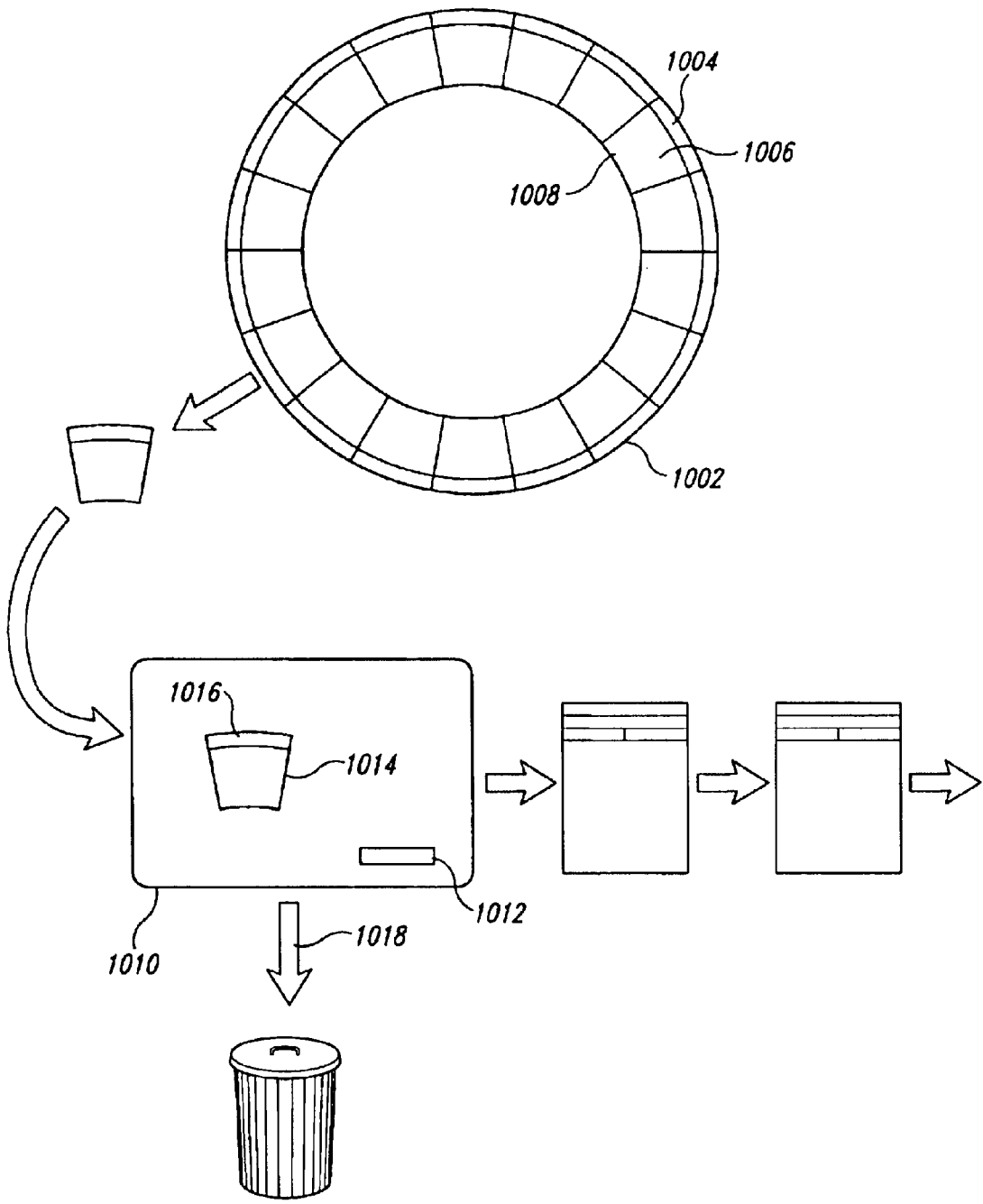
FIG. 10 illustrates a second technique for purging a transmit queue of stale packets.

FIG. 10 illustrates a second technique for purging a transmit queue of stale packets. Each entry in the transmit queue 1002 of FIG. 10 includes a time stamp, such as time stamp 1004 associated with message descriptor 1006 in entry 1008. A time stamp is assigned to each message descriptor upon reception of the corresponding communications packet by the network multiplexer. Generally, large, monotonically increasing integers are used as time stamps. The port 1010 associated with the transmit queue 1002 includes a current threshold time stamp value 1012 that monotonically increases under the control of a system-wide clock. When the port 1012 dequeues a next message descriptor 1014, the port compares the time stamp 1016 associated with the dequeued message descriptor 1014 to the current threshold time stamp value 1012, and, if the time stamp 1016 is smaller than the threshold value 1012, the port discards the message descriptor 1018, because the communications packet corresponding to the message descriptor has grown stale. Otherwise, the communications packet corresponding to the message descriptor was received sufficiently recently by the network multiplexer that it can be transmitted by the port to its intended destination prior to expiration of the maximum transmit delay time for that packet.

The time stamp method illustrated in FIG. 10 is reliable, but may result in significantly increased memory requirements for implementing transmit queues. Generally, the time stamp must be a fairly large integer, to avoid frequent wrapping of the time stamp threshold and corresponding failure of the comparison algorithm used by the port to determine whether a time stamp indicates that an associated; message descriptor has become stale. However, in the case of a network multiplexer having a large number of ports, each port having a transmit queue with many tens or hundreds of entries, a comparatively large amount of memory will be used for storing time stamps. Because memory size is a fundamental constraint in the design and manufacture of network multiplexers, particularly for network multiplexers having control functionality implemented entirely within integrated circuits, the time stamp method illustrated in FIG. 10 is often too expensive in memory usage for incorporation into network multiplexers.

FIGS. 11A–F illustrate the method of the present invention. In FIGS. 11A–F, two transmit queues 1102 and 1104 are shown along with a graphical representation of a system-wide timer 1106. The present invention will be illustrated with respect to an ethernet network multiplexer. In this case, the system-wide clock is incremented in one-second intervals 1108–1111. At each interval, a transmit queue monitoring function is awakened. The actions of the transmit queue monitoring function will be illustrated in the series of figures starting with FIG. 11A and ending with FIG. 11F. The current state of the system-wide clock is indicated by the single clock hand 1112 within the graphical representation of the system-wide clock 1106. Of course, the clock in a network multiplexer is implemented in hardware, and produces electronic signals rather than moving a clock hand. When necessary, the same numerical labels used in FIG. 11A will be used throughout FIGS. 11A–F.

Figure 11A:
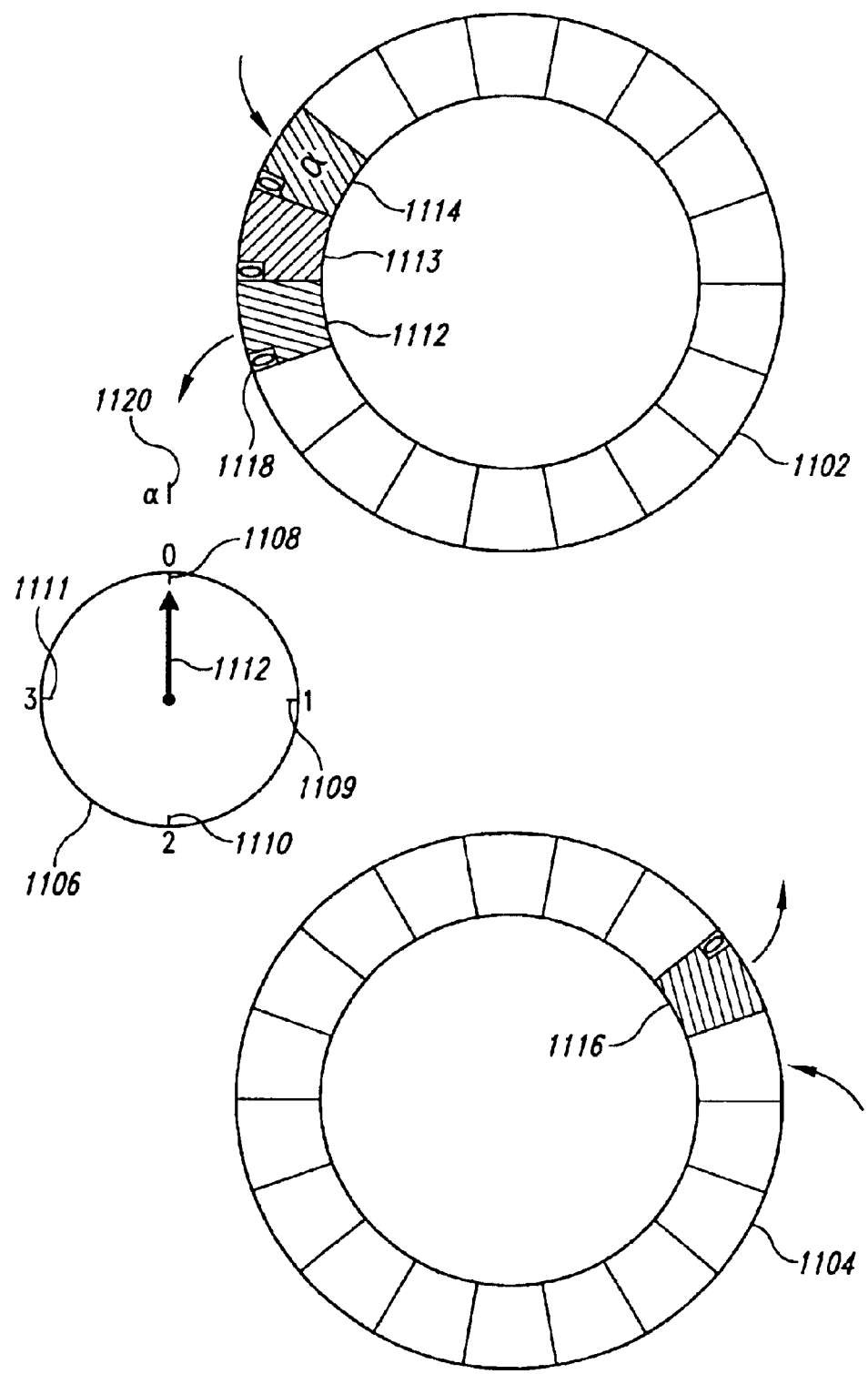
FIGS. 11A–F illustrate the method of the present invention.

In FIG. 11A, the transmit queue 1102 contains three message descriptors 1112–1114. The next message descriptor to be removed will be message descriptor 1112 and the most recently queued message descriptor is message descriptor 1114. Transmit queue 1104 contains a single message descriptor 1116. Each queue entry contains a bit flag paired with the message descriptor, such as the bit flag 1118 paired with the message descriptor 1112. When a message descriptor is first queued into a transmit queue, the bit flag is set to zero. The example of FIGS. 11A–F begins just prior to invocation of the transmit queue monitoring function that will occur when the system clock reaches the zero second marker 1108. This initial time point will be called "α" and is shown in FIGS. 11A–F by the radial line segment 1120. The most recently queued message descriptor in transmit queue 1102 is also labeled "α" to indicate that it was queued at time "α."

Figure 11B:
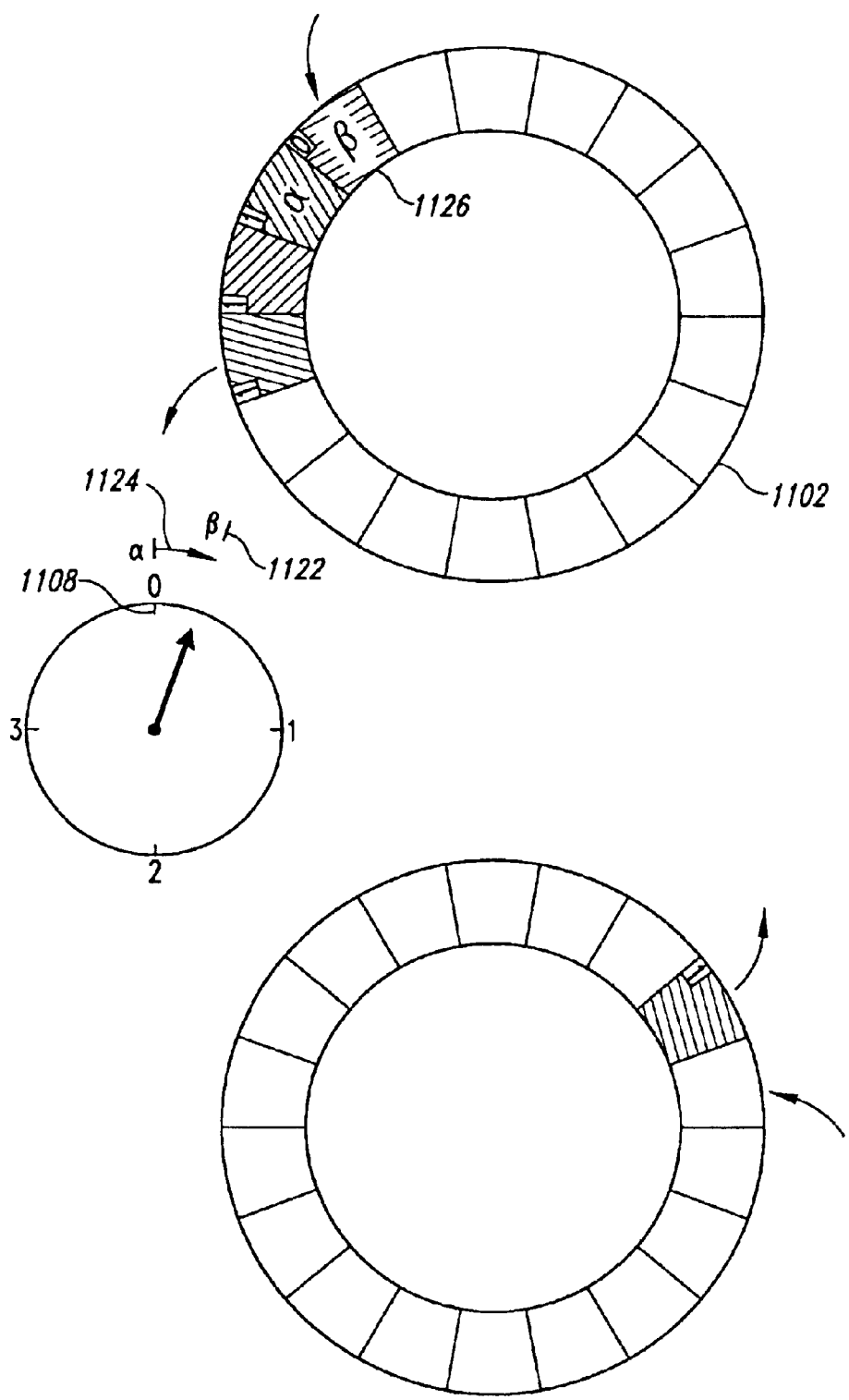

FIG. 11B shows the state of the two transmit queues after the system clock has advanced past the zero second point 1108, a time referred to in FIGS. 11B–F as "β," indicated in FIGS. 11B–F by the radial line segment 1122. As the system clock advances, the lapse of time between times "α" and "β" and the present time are indicated by semi-circular, directed line segments, such as semi-circular directed line segment 1124. When the system clock advanced past the zero second marker 1108, the transmit queue monitoring function was invoked. The transmit queue monitoring function examines each entry in each transmit queue. The transmit queue monitoring function changes the bit flag from "0" to "1" for all transmit queue entries having a bit flag value of "0", and discards all transmit queue entries having a bit flag value of "1." A new entry 1126 has been queued into transmit queue 1102 at time "β," and is marked with a symbol "β" in FIGS. 11B–F. Note that the transmit queue entries that had already been queued into the transmit queues at time "α," and that were shown in FIG. 11A, now have bit flag values of "1," while the newly queued entry 1126 has a bit flag value of "0."

Figure 11C:
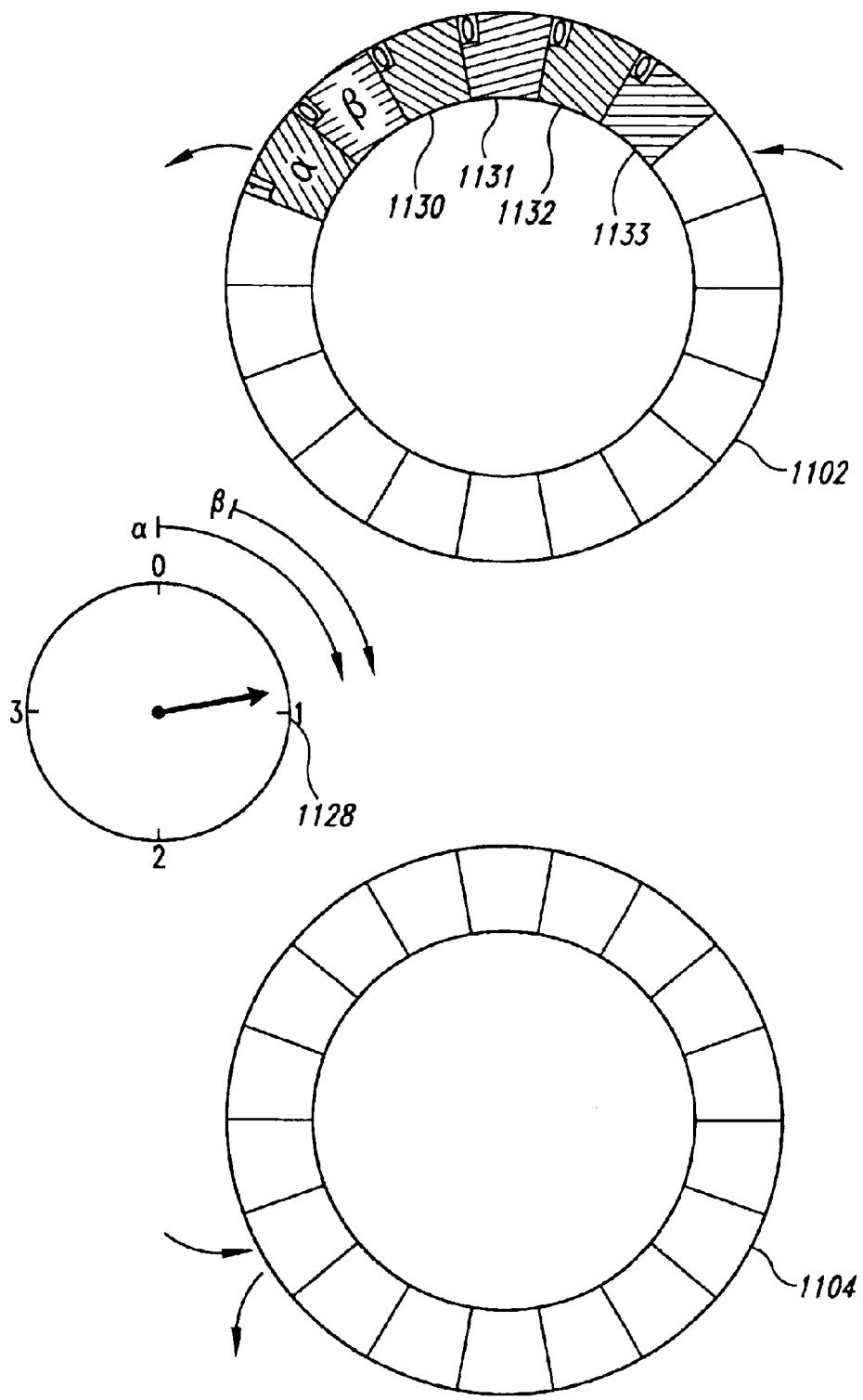

In FIG. 11C, the system clock has advanced to a time just prior to the one second marker 1128. The transmit queue entries 1112 and 1113 of transmit queue 1102 in FIG. 11A have been processed by the port associated with transmit queue 1102 and de-queued from transmit queue 1102. The single entry 1116 in transmit queue 1104 in FIG. 11A has also been processed by the port associated with transmit queue 1104 and has been de-queued from transmit queue 1104. Transmit queue 1102 has started to back up, because the transceiver component of the port associated with transmit queue 1102 has detected a packet collision and has transitioned into a back off mode in which no further communications packets are transferred for a specified length of time. At the time illustrated in FIG. 11C, four additional entries 1130–1133 have been queued to transmit queue 1102.

Figure 11D:
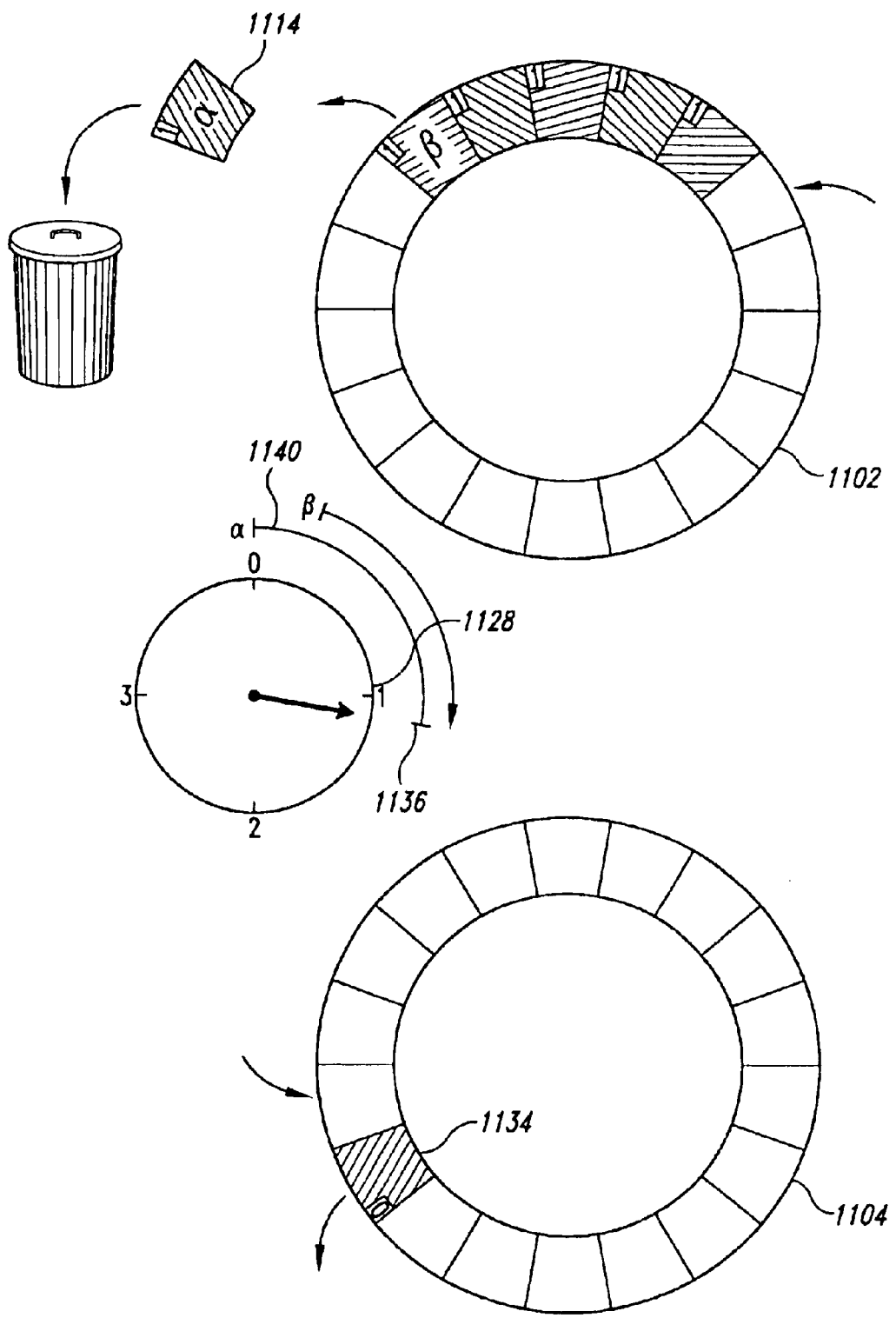

In FIG. 11D, the system clock has advanced past the one second mark 1128 and the transmit queue monitoring function has been invoked a second time. In the second invocation of the transmit queue monitoring function, queue entry 1114 of transmit queue 1102, which had a bit flag value of "1," was removed from transmit queue 1102 and discarded by the transmit queue monitoring function. In addition, the bit flags of the remaining queue entries of FIG. 11D were changed by the transmit queue monitoring function from "0" to "1." In addition, another queue entry 1134 has been queued to transmit queue 1104. In FIG. 11D, the time point at which the queue entry 1114 was dequeued and discarded form transmit queue 1102 by the transmit queue monitoring function is marked with radial line segment 1136. Thus, queue entry 1114 was discarded after residing in the queue for slightly more than one second, indicated in FIG. 11D by the semi-circular line segment 1140.

Figure 11E:
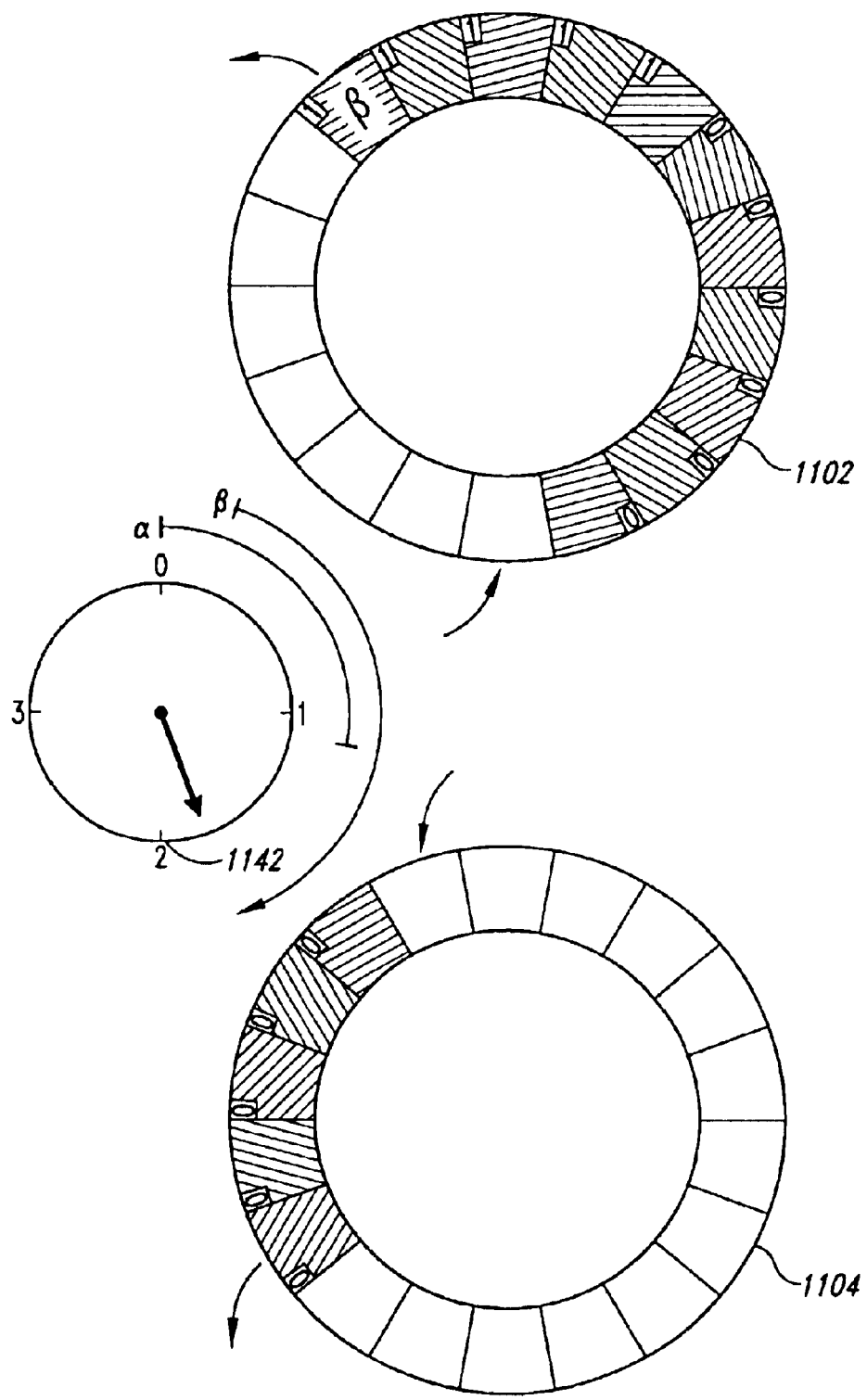

In FIG. 11E, the system clock has advanced to a time point just prior to the two-second marker 1142. Additional entries have been queued to transmit queue 1104 and six additional entries have been queued to transmit queue 1102. Transmit queue 1102 is still backed up.

Figure 11F:
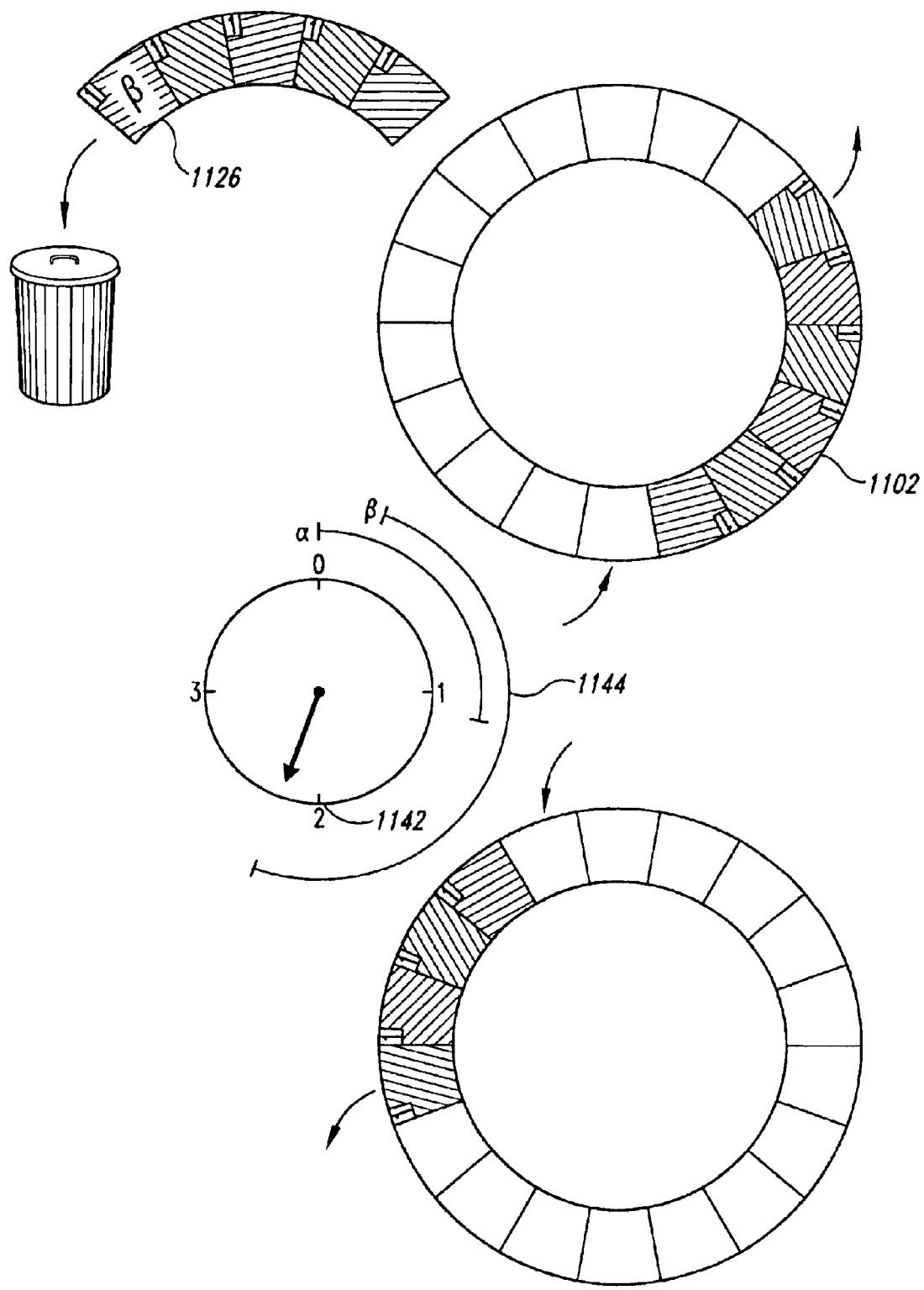

In FIG. 11F, the system clock has advanced to a point just past the two-second mark 1142 and the transmit queue monitoring function has been called a third time. During this third invocation of the transmit queue monitoring function, the queue entries that had bit flag values of "1" in FIG. 11E have been dequeued from transmit queue 1102 by the transmit queue monitoring function and discarded, including the entry 1126 that was originally queued to the transmit queue at time "β" illustrated in FIG. 11B. Thus, queue entry 1126 resided in transmit queue 1102 for just under two seconds, indicated in FIG. 11F by semi-circular line segment 1144. Thus, by the method of the present invention illustrated in FIGS. 11A–F, a queue entry may reside in a transmit queue for anywhere from slightly more than one second, as, for example, queue entry 1114, to slightly less than two seconds, as, for example, queue entry 1126. Thus the method of the present invention guarantees that no queue entry will reside in a transmit queue for longer than two seconds before being discarded by the transmit queue monitoring function. By the method of the present invention, stale queue entries are discarded well before the maximum transit delay time of four seconds for the ethernet.

In FIGS. 12A–C, a C++-like pseudo-code implementation of the method of the present invention is provided. In this C++-like pseudo-code implementation, a number of classes are declared to set the stage for implementation of a number of transmit queue routines that illustrate the method of the present invention. Implementations for the member functions of many of these initial classes are not shown for the sake of brevity. These member functions involve well-known software techniques that can be easily implemented by an ordinarily-skilled software practitioner. Moreover, many alternative implementations can be developed to effect the functionality described by these classes.

Three initial, stage-setting classes are declared in FIG. 12A. These classes include: (1) "message," declared on lines 3–12 of FIG. 12A, an instance of which represents a communications packet; and (2) "messageDescriptor," declared on lines 14–27 of FIG. 12A, an instance of which represents a transmit queue entry. A message descriptor includes a data member "msgPtr," a pointer to a communications packet, or message, declared on line 17 of FIG. 12A, and a Boolean data member "flag," declared on line 18 of FIG. 12A, which represents a bit flag such as bit flag 1118 in FIG. 11A. The message descriptor member function "zeroFlag," declared on line 23 of FIG. 12A, sets the Boolean data member "flag" to "0," or FALSE. The member function "query," declared on line 24 of FIG. 12A, returns the Boolean value TRUE if the instance of a message descriptor class for which data member function "query" is called has a Boolean value TRUE, or "1," stored within the message descriptor's Boolean data member "flag." Otherwise, the member data function "query" sets the Boolean data member "flag" to Boolean value TRUE, or "1," and returns the Boolean value FALSE. An implementation for the member function "query" is shown on lines 34–42. The member function "query" is used during transmit queue monitoring to ascertain which queue entries are stale so that they can be discarded.

The class "transmitQueue" is declared on lines 1–19 of FIG. 12B, and implementations of various transmit queue member functions follow that declaration in FIGS. 12B and 12C. Member functions of the class "transmitQueue" include: (1) "empty," declared on line 7 of FIG. 12B, which returns a Boolean value indicating whether or not the transmit queue is empty; (2) "full," declared on line 8 of FIG. 12B, which returns a Boolean value indicating whether or not the transmit queue is full; (3) "num," which returns an integer value that represents the number of entries queued in the transmit queue; (4) "inc," which increments an index of a transmit queue entry and returns a Boolean value TRUE if the index points to a different queue entry queued to the transmit queue, or to the entry pointed to by the head index for the queue, and otherwise returns the Boolean value FALSE; (5) "dec," which decrements an index of a queue entry within a transmit queue providing that the queue entry is not the last entry in the queue, and returns TRUE, and otherwise returns FALSE in the case that the index, or pointer, points to the last entry of the queue; (6) "queueMDesc," a member function that queues a message descriptor to the transmit queue; (7) "dequeueMDesc," declared on line 15 of FIG. 12B, a member function that dequeues a message descriptor from the transmit queue; and (8) "tick," a member function that is called at one-second intervals in response to ticks of the system-side clock and that implements the transmit queue monitoring function described in FIGS. 11A–F. Implementations of the transmit queue member functions "empty," "full," "num," and "inc" are provided following the declaration of the class transmit queue in FIG. 12D, and implementations of the transmit queue member functions "dec," "queueMDesc," "dequeueMDesc," and "tick" are provided in FIG. 12C. As can be seen in the declaration of the class "transmitQueue" in FIG. 12D, an instance of the transmit queue includes an array of message descriptors, called "queue," declared on line 4, and integer indexes that represent the head and tail pointers of the transmit queue, declared on lines 5 and 6 of FIG. 12D. The implementations of the private member functions "empty," "full," "num." "inc," and "dec" are relatively straight forward and will not be described further, as is also the case with the public transmit queue member functions "queueMDesc" and "dequeueMDesc."

The method of the present invention is embodied in the Boolean data member "flag" of the class "messageDescriptor" and in the transmit queue member function "tick," an implementation for which is given on lines 81–91 of FIG. 12C. The transmit queue member function "tick" is called by the network multiplexer for each transmit queue at one second intervals, controlled by a system-wide clock. If the transmit queue is empty, as detected by member function "tick" on line 85, tick simply returns. Otherwise, tick sets the local variable "i" to point to the least recently queued entry in the transmit queue. In the while-loop of line 88, tick continuously decrements the pointer "i" while the message descriptor entry referenced by the pointer "i" within the transmit queue returns the Boolean value FALSE in response to invocation of the message descriptor member function "query." If the member function "dec" returns the Boolean value FALSE, indicating that no further queue entries remain in the transmit queue, then tick returns, because the bit flags for all queue entries have been changed from "0" to "1" by repeated calls to the message descriptor member function "query" and because no queue entry was found with a bit flag value of "1." However, if tick does not return on line 88, then there are queue entries with bit flag values of "1" remaining in the transmit queue. Tick discards these queue entries by setting the data member "tail" to the last non-stale queue entry detected during execution of the while-loop of line 88 and line 90. Upon completion of the member function "tick," all stale queue entries have been removed and all queue entries that previously had bit flag values of zero now have bit flag values of one.

Although the present invention has been described in terms of a particular embodiment, it is not intended that the invention be limited to this embodiment. Modifications within the spirit of the invention will be apparent to those skilled in the art. For example, the transmit queue monitoring function illustrated in FIGS. 11A–F and implemented in FIGS. 12A–C can be implemented in any number of different computer languages, an almost limitless number of ways, or, alternatively, can be implemented as logic circuits within an integrated circuit implementation of the control functionality of a network multiplexer. The removal of queue entries that have grown stale after specified periods of time is a generally useful method in many types of electronic devices and in many types of computer software programs. Thus, the method and system of the present invention may be profitably applied in a vast number of applications outside of network multiplexers. The timing of transmit queue monitoring function invocations can vary, depending on protocol-specified maximum transit delays.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed:

1. A method for recognizing stale communications packets in a transmit queue containing queued message descriptors, the method comprising:
   including a stale-entry field within each message descriptor in the transmit queue;
   upon initially queuing a message descriptor to the transmit queue, setting the stale-entry field to an initial value; and
   at regular intervals, updating the stale entry field of message descriptors queued to the transmit queue and removing from the transmit queue state message descriptors having a particular value in the stale-entry field that indicates that a message descriptor containing the particular value is stale.

2. The method of claim 1 wherein the stale-entry field comprises a single bit, wherein the initial value of the stale entry field is the bit value 0, and wherein, at each regular interval, all message descriptors having stale-entry fields containing the bit value 1 are removed from the transmit queue and all stale-entry fields containing the bit value 0 are updated to contain the bit value 1.

3. The method of claim 1 wherein the stale-entry field comprises a single bit, wherein the initial value of the stale entry field is the bit value 1, and wherein, at each regular interval, all message descriptors having stale-entry fields containing the bit value 0 are removed from the transmit queue and all stale-entry fields containing the bit value 1 are updated to contain the bit value 0.

4. The method of claim 2 wherein the transit queue is associated with a communications port in a network multiplexer.

5. The method of claim 2 wherein message descriptors include a reference to a storage location containing data to be included in a communications packet transmitted by a communications port associated with the transmit queue.

6. A queue of entries that efficiently tracks queued entries to allow stale entries to be recognized, the queue comprising:

indications of the head and tail entries queued to the queue;

a memory area in which entries are stored;

a stale-entry field within each entry queued to the transmit queue comprising a single bit, the initial value of the stale entry field having the bit value 0; and an update routine executed at regular intervals to recognize stale entries and to update stale-entry fields of queued entries that recognizes all message descriptors having stale-entry fields containing the bit value 1 as being stale and updates all stale-entry fields containing the bit value 0 to contain the bit value 1.

7. The queue of claim 6 wherein the initial value of the stale entry field is the bit value 1, and wherein the update routine recognizes all message descriptors having stale-entry fields containing the bit value 0 as being stale and updates all stale-entry fields containing the bit value 1 to contain the bit value 0.

8. The queue of claim 6 or 7 wherein the update routine removes stale entries from the queue after recognizing the entries as stale.

9. The queue of claim 8 used as a transmit queue associated with a communications port in a network multiplexer.

10. The queue of claim 9 wherein entries are message descriptors that describe communications packets that are to be transmitted by the associated communications port.

11. A network multiplexer comprising:

a number of communications ports, each communication port having a transceiver and a communications controller;

a memory;

an internal bus for transferring packets from ports to memory and from memory to ports; a a transmit queue associated with each port, each transmit queue containing a memory area that stores message descriptors that reference packets stored in memory, each message descriptor including a stale-entry field, the transmit queue efficiently tracking queued entries to allow stale entries to be recognized, the stale-entry field comprising a single bit, the initial value of the stale entry field having the bit value 0; and an update routine executed at regular intervals to recognize stale entries and to update stale-entry fields of queued entries in transmit queues associated with communications ports in the network multiplexer, the update routine recognizing all message descriptors having stale-entry fields containing the bit value 1 as being stale and updates all stale-entry fields containing the bit value 0 to contain the bit value 1.

12. The network multiplexer of claim 11 wherein the initial value of the stale entry field is the bit value 1, and wherein the update routine recognizes all message descriptors having stale-entry fields containing the bit value 0 as being stale and updates all stale entry fields containing the bit value 1 to contain the bit value 0.

13. The network multiplexer of claim 11 wherein the update routine removes stale entries from the queue after recognizing the entries as stale.

* * * * *